United States Patent
Wellman et al.

(10) Patent No.: US 9,891,306 B2
(45) Date of Patent: Feb. 13, 2018

(54) GEOLOCATING A REMOTE EMITTER

(71) Applicant: Raytheon Company, Waltham, MA (US)

(72) Inventors: William H. Wellman, Santa Barbara, CA (US); Lee M. Savage, Santa Barbara, CA (US); John T. Broad, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 196 days.

(21) Appl. No.: 14/790,441

(22) Filed: Jul. 2, 2015

(65) Prior Publication Data

US 2017/0003376 A1    Jan. 5, 2017

(51) Int. Cl.
*G01S 5/02*    (2010.01)
*G01S 5/06*    (2006.01)
*G01S 7/02*    (2006.01)

(52) U.S. Cl.
CPC    *G01S 5/06* (2013.01); *G01S 5/02* (2013.01); *G01S 5/0221* (2013.01); *G01S 5/0252* (2013.01); *G01S 5/0278* (2013.01); *G01S 7/021* (2013.01)

(58) Field of Classification Search
CPC . G01S 5/06; G01S 5/02; G01S 5/0221; G01S 5/0252; G01S 5/0278; G01S 7/021; G01S 3/46; G01S 3/50; G01S 3/02; G01S 3/04; G01S 3/043; G01S 5/04; H01Q 21/29
See application file for complete search history.

(56) References Cited

U.S. PATENT DOCUMENTS

| | | | |
|---|---|---|---|
| 6,791,493 B1 * | 9/2004 | Rose | G01S 3/46 342/156 |
| 8,294,616 B1 | 10/2012 | Ormesher et al. | |
| 8,297,884 B1 * | 10/2012 | Khachaturian | B63B 35/00 114/266 |
| 9,007,262 B1 * | 4/2015 | Witzgall | G01S 5/10 342/357.78 |
| 2002/0033769 A1 | 3/2002 | Bass et al. | |

(Continued)

OTHER PUBLICATIONS

International Search Report and Written Opinion from related PCT Patent Application No. PCT/US2016/023875 dated Jun. 17, 2016.

*Primary Examiner* — Gregory C. Issing
*Assistant Examiner* — Daniel P Malley, Sr.
(74) *Attorney, Agent, or Firm* — Burns & Levinson, LLP; Joseph M. Maraia

(57) ABSTRACT

A method for improving geolocation accuracy in a passive radar warning receiver, using synchronized data curve-fit and interpolation to asynchronous and noisy receiver and navigation measurements over observation periods that are extended to reduce inaccuracies caused by noise. The present disclosure yields synchronized data samples at intervals short enough that constant-rate equations are valid, even though the actual motions over the observation interval may be more complex and have higher-order dynamics. It reduces noise, synchronizes data samples, and is readily adapted to motions with variable acceleration. The method generates rate samples short enough to satisfy constant rate assumptions, yet fit data over intervals long enough to enhances measurement accuracy by reducing measurement noise.

7 Claims, 8 Drawing Sheets

(56) References Cited

U.S. PATENT DOCUMENTS

| | | | |
|---|---|---|---|
| 2006/0114157 A1* | 6/2006 | Kolanek | G01S 3/46 342/424 |
| 2008/0161016 A1* | 7/2008 | Hochwald | G01S 5/02 455/456.2 |
| 2008/0186235 A1* | 8/2008 | Struckman | G01S 5/0221 342/465 |
| 2014/0278214 A1 | 9/2014 | Broad et al. | |
| 2014/0281779 A1* | 9/2014 | Wellman | G06F 11/0706 714/746 |

* cited by examiner

GEOLOCATING A REMOTE EMITTER

GOVERNMENT SUPPORT

This invention was conceived with government support under FA8625-11-C-6600 awarded by the Navel Air Warfare Center Weapons Division. The government has certain rights in the present disclosure.

FIELD OF THE INVENTION

The present invention generally relates to geo-location of remote emitters devices, and in particular to mobile radar warning receivers with this function.

BACKGROUND

There is a need for airborne radar warning receivers (RWR)s to determine the specific location of a radar emitter through detection and analysis of radar signals emitted by the radar emitter, combined with measurements of RWR position and motion measured by a aircraft navigation system (NAV) or other means. Such determination of radar emitter position in earth coordinates is commonly referred to as geolocation. Geolocation techniques typically capture samples of the radar emitter signal with passive receivers mounted on a moving platform, such as an aircraft, and calculate geolocation from time or frequency difference of arrival of signals received by two or more antennas. Geolocation techniques are generally performed to identify the geolocation of stationary radar emitters at fixed earth locations. Geolocation also can be determined for emitters mounted on moving ships, vehicles, or possibly other aircraft.

SUMMARY OF THE INVENTION

Emitter location can be determined from measurements of signals received by an RWR antenna pair, combined with measurements of platform orientation and motion by NAV equipment. Processing of RWR data can measure time difference of arrival (TDOA) and frequency difference of arrival (FDOA) of emitter signals, and processing of NAV data can predict FDOA and TDOA for any assumed emitter location. Emitter location can be found by calculations that minimize the difference between measured and predicted TDOA acid/or FDOA.

Embodiments of the present disclosure use special signal processing to overcome the significant measurement problem of achieving accurate measurements with noisy data and platform flexure and vibration. Accuracy of both measured and predicted TDOA and FDOA typically is enhanced by combining values from observation of several pulse observations, and by calculating individual values by analysis of several pulses of the emitter waveform. Increasing the observation time reduces the impact of random receiver noise, by combining values for more pulses. However, long observations become inaccurate when platform vibration introduces variations in TDOA and FDOA over the observation period. Embodiments of the present disclosure resolve this dilemma, by yielding TDOA and FDOA data samples at short intervals at identical sample times, yet retaining long observations to reduce receiver noise. They also improve noise measurements that further increase geo-location accuracy.

One embodiment of the present invention provides a method for geographically locating a remote emitter using a passive receiver, the method comprising: receiving and detecting signals from the remote emitter along with their time of arrival via two or more sensors over a series of observation periods, the two or more sensors positioned to receive emitter signals at different locations on a platform; determining an equation form f(t) representing anticipated observed FDOA and/or TDOA variation that accommodates the presumed differential motion of the paired sensors over each of the observation periods, as characterized by at least one of: an unchanging acceleration of the sensors, unchanging velocity, sinusoidal motion of certain frequency, any anticipated characteristic flexure or vibration characteristic of the platform; and any persistent characteristic noted in FDOA and/or TDOA data; determining equation coefficients for equation f(t) such that it best fits a differential phase or time of arrival of the of the detected emitter signal; determining through calculus theory or other method, coefficients for a time-derivative f'(t) of equation f(t); determining sampling times over the interval at which data samples will be generated for geolocation calculations, based on anticipated dynamics of signal variations; determining at the sampling times, frequency difference of arrival (FDOA) values from the time-derivative equation f'(t), and/or time difference of arrival (TDOA) values from the time equation f(t); measuring platform position and motion data, such as motion, attitude, and position of the two or more sensors at motion sampling times over a time frame generally preceding and including each observation period of the series of observation periods, using inertial and location sensors on the platform; determining estimated FDOA and/or TDOA values at the motion sampling times, as implied by the current estimated emitter location and measured platform position and motion; interpolating FDOA data estimates and/or TDOA data estimates at the sampling times selected for measured FDOA and/or TDOA values for each observation period; and determining an improved estimate of emitter location based on a comparison of the measured and predicted values over each observation interval.

BRIEF DESCRIPTION OF THE DRAWINGS

The foregoing will be apparent from the following more particular description of example embodiments of present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

Figure 1:
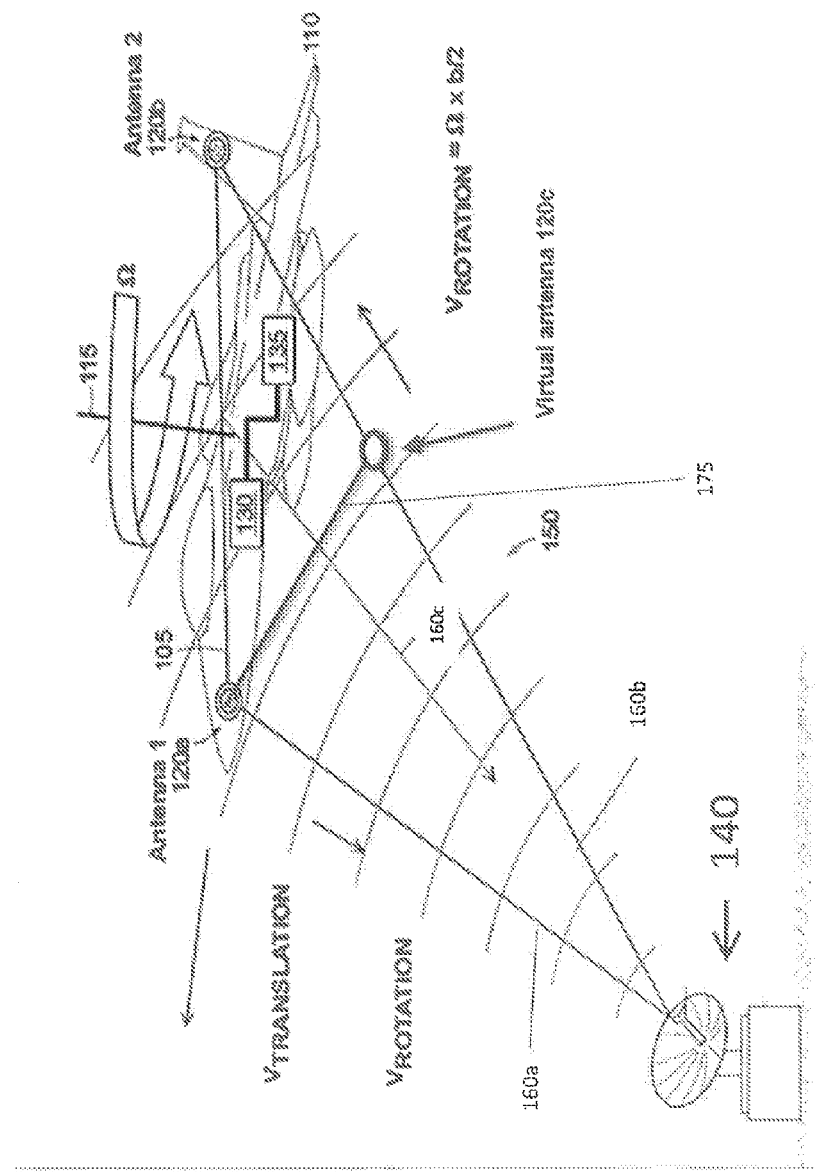
FIG. 1 is a schematic illustration of an environment in which a mobile platform remotely senses radiation from a remote emitter, in accordance with an example embodiment of the present disclosure.

A description of example embodiments of the present disclosure follows.

A technique for determining the location of a radar emitter is based on passive measurement of radar pulses received by two receivers separated by a fixed distance on a moving platform (e.g., an aircraft). The measured radar pulses together with measured platform motion and position, enable geometric location of the radar emitter. In the preferred embodiment, the radar measurements are made with a radar warning receiver (RWR), while the platform measurements are made with position-aided navigation system (NAV). The description to follow also applies to other embodiments, such as an acoustic or sonar system, a semi-active radar system, or an optical or ladar system.

A geolocation technique determines the location on earth of a radar emitter, using measurements of time difference of arrival (TDOA) or frequency difference of arrival (FDOA) of a pulsed waveform. Joint solutions based on TDOA and FDOA combined yield even better performance, by using two orthogonal measurements. TDOA and FDOA for a pair of RWR antennas vary with emitter and aircraft location, and the orientation of the two antennas. FDOA additionally depends upon platform velocity and turning rates. Measured values for TDOA and FDOA are made by analyzing the actual emitter signals received by the RWR. In one approach, estimated values for TDOA and FDOA are calculated from an estimated emitter position, combined with NAV data. For FDOA, the emitter frequency sensed by the RWR is used. Geolocation can be solved by sequential processing that adjusts the estimated emitter location such that measurements agree with measurements as they occur, or by batch processing of an accumulated number of measurements. Geolocation accuracy can be very good as multiple measurements are made over time, even though any individual measurement may be corrupted by noise.

Embodiments of the present disclosure apply to emitters with pulsed waveforms, which series of pulses or "tone bursts" of radiation at a "carrier frequency" that is much higher than the pulse repetition frequency. The receiver observes the emitter signal intermittently, in a series of observation periods (often called a "receiver dwells"), which typically are long enough to contain several pulses. TDOA and FDOA values are calculated from measurements of the multiple individual pulses received during this observation period, so extending the observation period reduces the effects of random noise and increases receiver sensitivity, as is well known. However, with current techniques, if TDOA or FDOA vary over this observation period, their evaluation becomes inaccurate. Embodiments of the present disclosure overcome the inaccuracies due to long observation periods, thereby enabling full receiver sensitivity and full TDOA and FDOA calculation accuracy. It also resolves current difficulties of matching of predicted and measured values for TDOA and FDOA in both form and timing.

A radio-frequency (RF) pulse waveform can be sensed by two antennas of a radar warning receiver (RWR) of the platform. Other known or yet to be known equipment may be used to sense emissions of other electromagnetic frequencies or even of acoustic emissions such as sensed by sonar equipment.

Measurements of FDOA are extremely sensitive to motion, particularly for common RF wavelengths. For example, even a wavelength as long as 4 inches yields a 1 milliHertz FDOA for a differential motion of only 0.004 inches per second, whereas the measurement techniques described in this patent can achieve accuracies well over an order of magnitude better, thereby yielding signal-to-error (or signal-to-noise) ratio well over 10 to 1 in measured FDOA values. By contrast, a time calibration accuracy of 1 nanosecond yields a differential position of 3.6 inches, and corresponds to a signal-to-error ratio of unity for typical RWRs that lack exact time synchronization at the antennas to receiver.

Extreme sensitivity to motion is well known for interferometer systems. Embodiments of the present disclosure are able to implement such sensitivity in an ordinary RWR. Indeed, since the distance between antennas is much greater for most RWR systems than for interferometer systems, the RWR has potentially greater accuracy in determining the geolocation of a remote emitter than does the more expensive interferometer system. However, despite the apparent lesser sensitivity of TDOA, it can be used alone if signal transit times between sensor channels are calibrated with sufficient accuracy. Also, since TDOA and FDOA essentially are orthogonal coordinates, the combination of the two is useful.

A modern RWR can measure FDOA with high precision at a number of fixed observation times, often called "receiver dwells". Typically, one FDOA value is measured for each individual dwell, assuming that the observation period of each dwell has a time period that is short enough to ensure that the measured TDOA is constant over the entire duration of the dwell. However, such an assumption requires that turning rates and translational velocity of the mobile platform (e.g., aircraft), to which the RWR is mechanically and/or communicatively coupled, are also constant over the dwell. Thus, errors are introduced when the velocity of the mobile platform varies over a dwell. Such error is particularly troublesome when long observation times are required to minimize noise in measurements of received radar emitter signals. Thus, it is difficult to realize the potential accuracy of FDOA when there are rapid motions of the antennas that cause FDOA to vary over an observation period, since practicable calculations usually assume constant values.

Rapid FDOA variations during a dwell can be caused by airflow turbulence and control surface movements, combined with airframe flexure and resonant vibrations of the mobile platform. Such variations make each solution step inaccurate if FDOA values vary from an assumed average value (i.e., the one measured FDOA value for a dwell). Current approaches to geolocation determination do not resolve the basic dilemma that noise makes emitter signal measurements inaccurate if dwell time is too short; yet, on the other hand, non-constant motions of the mobile platform make a constant-rate assumption incorrect if dwell time is too long. In other words, attempts to increase the dwell time to mitigate the effect of noise introduces errors in FDOA calculations.

Embodiments of present disclosure resolve this dilemma by means of a novel data processing technique that preserves the noise advantages of long sample times. In addition, the technique forms RWR and navigation system (NAV) data at suitable shorter time intervals over which velocity is approximately constant. The disclosed data processing technique enables accurate constant-velocity calculations with multiple velocity measurements, combined with the benefit of lower noise of a long observation period. It yields multiple FDOA measurements as if measured by shorter dwells, yet actually is measured over a longer dwell that reduces RWR noise. It also resolves a second problem of accurately synchronizing FDOA measurements with motion measurements.

Frequency difference of arrival (FDOA) can be measured as differential phase rate of change, and depends directly on a difference between emitter-to-antenna velocities of two RWR antennas. This measures wavefront interference like an interferometer, which typically fits all antennas on a baseline that fits within a compact wing-mounted pod. However, the RWR antennas have a much longer baseline distance between antennas, which makes FDOA more sensitive to the aircraft platform turning rates and translational motions. This increased sensitivity to motion is more responsive to the dynamic geometry of antenna motion, thus yields greater geolocation accuracy when antenna motion is measured accurately by individual inertial motion sensors.

Time difference of arrival (TDOA) depends on the difference in distance along lines-of-sight from each of two antennas to an emitter. TDOA is sensitive to time delays due to antenna electronics and cable length variations, which may be difficult to calibrate. FDOA has the advantage that such time delays are unimportant, thus need not be calibrated.

FDOA and TDOA have both rotational and translational components. The rotational component of FDOA depends on aircraft turning rate, and is effective at all ranges, just as the rotational component of TDOA depends on aircraft aspect relative to the emitter line-of-sight (LOS). The translational components are most significant at close range, and depend on the LOS angular rate of change for FDOA, and on the LOS angles for TDOA.

A full three-dimensional solution for geolocation further requires the height of the aircraft above ground level (AGL). In particular, given TDOA, FDOA, and AGL, geolocation can be determined directly, for example as set forth in U.S. patent application Ser. No. 14/283,826, which is incorporated herein by reference. Alternatively, gradient methods can be used for solution, based on incrementally reducing the error between measured and predicted values of TDOA and FDOA, using gradient descent techniques to update the emitter location with each successive measurement. Error gradients are determined by geometric calculations using the current estimated emitter geolocation and known platform geolocation. As the aspect and position of platform relative to the emitter changes over a series of measurements, batch processing and incremental solutions both achieve a three-dimensional solution for location using the TDOA and FDOA measurements, either singly or in combination.

Embodiments of the present disclosure include methods and systems for determining a time difference of arrival (TDOA) and a frequency difference of arrival (FDOA) with respect to a pulsed waveform received from a remote source by at least two spaced apart sensors located on a moveable platform. An example of such techniques are given in U.S. Patent Publication No. 2014/0278214-A1, which is incorporated herein by reference. Such techniques achieve FDOA accuracies of 0.05 to 0.1 Hz, using waveform cross-correlation and curve-fitting; they also measure differential phase accurately, even for emitters with poor frequency stability. This FDOA accuracy is comparable to accuracies of high-quality military aircraft inertial navigation systems.

At each dwell, calculations with FDOA and NAV data yield a line of possible emitter locations on the surface of Earth. As the aircraft moves and maneuvers along its flight path, successive lines change, but cross at a point where the emitter is most likely located, known as its geolocation. Each such line generally is broadened or offset by noise, so this intersection really is a small region of uncertainty; however, multiple measurements reduce this uncertainty and yield good geolocation accuracy.

However, when changes in FDOA are caused by maneuver or vibration of the platform wherein the RWR resides, current technologies fail to measure FDOA accurately over observation periods even as short as 20 milliseconds. Over longer observation times, platform rates introduce other changes. Moreover, long observation times may be required to achieve adequate receiver sensitivity.

As stated herein, methods for geolocation are applied to data collected during successive short dwell samples, FDOA is determined as a slope of a straight-line fit to sequential differential phase measurements for a sequence of RF pulses in each dwell. Current methods further determine a mobile platform's turning rates, angles, and position at the time of each dwell using the mobile platform's navigation (NAV) system. Such methods then derive an estimated FDOA as a single value for each dwell using known geometric calculations. It should be noted that the method makes the tacit assumption that FDOA is constant over a subject dwell.

Embodiments of the present disclosure apply a unique sequence of equation fitting and equation evaluation methods that reduces complex situation dynamics to data that can be used in geolocation equations involving simpler dynamics of positions and rates that do not change during observations. The equation fits can be done over time intervals long enough to reduce sensor noise, and accurately fit higher order dynamics such as accelerations. To be compatible with practicable geolocation solutions, the equation evaluations yield data at intervals short enough that there are only first-order (e.g. constant differential rate) or less complex variations in position over the intervals.

This novel technology has several important benefits. It resolves the problem that the longer sample periods needed to reduce RWR measurement noise becomes inaccurate due to rapid physical motions arising from aircraft vibration and aerodynamic turbulence. It improves sampling accuracy, by applying consistent interpolation and smoothing to both the emitter and motion data. It improves data synchronization, by reconciling the sample times that are set by emitter signal occurrence with position and motion data that are set by the sample times set by the avionics data schedule. It yields data for geolocation intervals that adapt to measured data characteristics, by applying simple equations that are fit to measured data in a single initial step. It supports practicable and proven geolocation solutions that use first-order differential equations, even if measured data has higher-order characteristics.

FIG. 1 is a schematic illustration of an environment 100 in which a mobile platform 110 (e.g., a plane) is configured for passive geolocation of the remote emitter 140. Signals from emitter 140 are received by antennas 120a-120b, coupled with a signal processor 130. In particular, the mobile platform 110 is configured for passive geolocation of the remote emitter 140. The mobile platform 110 performs geolocation of the remote emitter 140 based on measured differential Doppler rates of the emitter signals that result from motion of the mobile platform 110 relative to the remote emitter 140. The platform 110 also carries a motion sensor 135 that measures the location and aspect of the platform 110 to provide an indirect measure of the location and motion of sensors 120a-120b.

In other embodiments, there may be individual motion sensors at each of the sensors 120a-120b, to improve measurement of motions of antennas 120a-120b, alone or in combination with motion sensor 135. This corrects for motions of the antennas 120a-120b that cannot be measured by the motion sensor 135, such as sensor motions resulting from flexure of the platform structure between antennas 120a-120b and motion sensor 135. Such flexure results from separation between motion sensor 135, which is located on structure within the platform and measures platform dynamics, and antennas 120a-120b, which are located on an outer surface of the platform to be exposed to emitter radiation. Flexure occurs in aircraft platforms as turbulence and maneuvers alter aerodynamic forces, and in vehicle and ship platforms due to buffeting of irregular ground and sea surfaces. Flexure also occurs in all platforms due to vibrations, which can give rise to significant FDOA variations.

The remote emitter 140 can be configured to emit modulated electromagnetic radiation 150 as a pulse waveform. The mobile platform 110 may be illuminated by the electromagnetic radiation 150 periodically, for example, during periods in which the remote emitter scans a volume of space that includes the mobile platform 110. Such instances in which the mobile platform is illuminated by the electromagnetic energy, detected by detector 120, and analyzed by processor 130 are often referred to as dwells or observations.

In some embodiments, the remote emitter 140 can be sonic, as would be used by a sonar system and antennas 120a-120b would be acoustic sensors. In other embodiments, the remote emitter 140 can be a reflector as used by a semi-active radar or ladar system that includes a transmitter. For example, a laser of a ladar system can direct laser energy toward the remote emitter 140, which then reflects the energy towards mobile platform 110. In yet other embodiments, the remote emitter 140 can be a reflector that is illuminated by a radar or ladar transmitter on a different platform, and detected by passive sensors 120a-120b. The remote emitter 140 can be, or include, an antenna that transmits RF signals. It should be noted that the remote emitter 140, in some examples, can be a moving object (e.g., an aircraft, ship or other moving remote emitter).

The mobile platform 110 receives multiple waves 150 of signal from the remote emitter 140 via the sensors 120a-120b (e.g., a first antenna and a second antenna). Using the received emissions 150, the mobile platform 110 can track and geo-locate the remote emitter 140. As an example, tracking of the remote emitter 140 can be utilized in weapon targeting systems in order to locate track the position of the remote emitter 140. As another example, tracking of the remote emitter 140 (e.g., rescue beacon, surveillance radar, cell phone, or tracking radar) can be utilized in order to facilitate search and rescue missions that require an accurate indication of the location of the remote emitter 140. In another example, tracking the earth coordinates of the remote emitter 140 can be utilized in order to facilitate intelligence gathering by surveillance systems, or locating and destroying the remote emitter 140 of an enemy threat. Although the mobile platform 110 is illustrated as an aircraft, the mobile platform can be any type of a mobile vehicle (e.g., land-based, air-based, space-based, or sea-based). For instance, the mobile platform can be an aircraft, ship, missile, or spacecraft.

The sensors 120a-120b are configured to capture at least a portion of the electromagnetic radiation 150 from emitter 140. The mobile platform 110 is configured to perform spatial maneuvers while electromagnetic energy is being received by the sensors 120a-120b. These maneuvers may be rotational or translational, and will change the distance between the first sensor 120a to the remote emitter 140 differently than the distance between the second sensor 120b to the remote emitter 140. For instance, if the mobile platform 110 rotates about the axis 115 in a clockwise direction (as shown), the first antenna (first sensor) 120a turns away from the remote emitter 140, while the second antenna (second sensor) 120b turns towards the remote emitter 140. This gives rise to a differential velocity that results in an instantaneous frequency difference of arrival (FDOA). In at least some embodiments, such rotational maneuvers can occur while the platform is also moving in a translational sense, with respect to the remote emitter 140 (e.g., from right to left in the figure). Alternatively or in addition, the platform itself can be positioned with a respective pitch, roll and yaw, one or more of which may also vary during a maneuver.

In these embodiments, the sensors 120a-120b can be passive sensors that receive radiation but do not transmit radiation. Passive sensing has the advantage of being simple, allowing for clandestine operation, requiring low power, and also can be implemented with only firmware and software changes to existing radar warning receiver equipment or other similar surveillance equipment. It should also be noted that, while two sensors 120a-120b are depicted, three or more sensors can be employed.

As stated above, the sensors 120a-120b receive emissions 150 (e.g., electromagnetic radiation) from the remote emitter 140. In response to receiving the electromagnetic radiation 150, the mobile platform 110 processes the received emissions 150 to determine a geolocation of the remote emitter 140. In an example, the mobile platform 110 determines the geolocation of the remote emitter 140 by measuring the frequency-difference-of arrival (FDOA) of the signals received by the pair of sensors, which can be thought of as the differential Doppler phase rate between the signals received by the pair of sensors 120a-120b. In another example, the mobile platform 110 determines the geolocation of the remote emitter 140 by determining a time difference of arrival (TDOA) between the signals received by the sensors 120a-120b. In yet another example, the mobile platform 110 determines both TDOA and FDOA as two measures of the same waveform. For instance, both FDOA and TDOA are determined from the same sample of the signal received by the sensors 120a-120b.

The key to determining geolocation of emitter 110 lies in a comparison of measured and estimated values of TDOA and FDOA. Measured values result naturally from the actual geolocation of emitter 140 and the dynamics of platform 110. Estimated values are determined by geometric calculations based on an estimated location of emitter 140 and the motion, position, and orientation of platform 110. Geolocation is determined by adjusting the estimated location of emitter 140 until the estimated and measured values of TDOA and FDOA agree. As will be discussed later, this solution is can be done by well-known methods, such as simultaneous equation solution or gradient descent solution.

A location of the mobile platform (e.g., aircraft) 110 is determined by the motion sensor 135 (e.g., aircraft NAV), as are aspect and angular rates of the platform 110. Based on known locations of antennas (sensors) 120a-120b on the platform 110, aspect and angular rates of the platform 110, and an estimated location of emitter 140, the signal processor 130 makes a number of calculations. For instance, the signal processor 130 estimates the line-of-sight 160c to the emitter 140, typically by averaging angles of individual line-of-sight paths 160a-160b to the estimated location of remote emitter 140. The signal processor 130 then determines an effective baseline 175 that is perpendicular to line-of-sight 160c, for use in geometric calculations of estimated TDOA and FDOA. The signal processor 130 determines an equivalent angular turning rate about an axis that is perpendicular to the line-of sight 160c, by conventional geometric transformations involving the equivalent baseline 175 distance between the antennas 120a and virtual antenna 120c. The equivalent baseline 175 is calculated as the actual baseline 105 as reduced by the cosine of the off-perpendicular angle of the line-of-sight 160c from the physical baseline 105 between from antennas 120a and 120b.

Equivalent baseline 175 is shown here as tangent to the wavefront of emitter radiation, between true antenna (sensor) 120a and virtual antenna (sensor) 120c and true antenna (sensor) 120a, for clarity of illustration. However, baseline 175 also could be defined as in this figure as between antenna (sensor) 120b and a virtual antenna (not shown) on sightline 160a opposite antenna 120b, or between two virtual antennas (not shown) at the half-distance between these two choices. The baseline lengths among these choices is inconsequentially small for "real world" applications where the baseline is very short relative to the emitter distance, and often a midpoint distance is used in calculations.

Estimated TDOA is calculated from the speed of light and the difference in distances along individual lines-of-sight to baseline 175, as for example the distances from emitter 140 to antenna 120a and to effective antenna 120c, located where equivalent baseline 175 intersects line of sight 160b. It calculates Estimated FDOA from the speed of light, emitter frequency, baseline 175, and turning rate.

As will be further discussed presently, the geolocation of a remote emitter (e.g., emitter 140 of FIG. 1) can be determined by adjusting a estimated emitter location to minimize the difference between sensor-RWR (radar warning receiver) measurements of TDOA and FDOA and estimated values calculated by geometric calculations involving measured platform dynamics and estimated emitter location.

Figure 2:
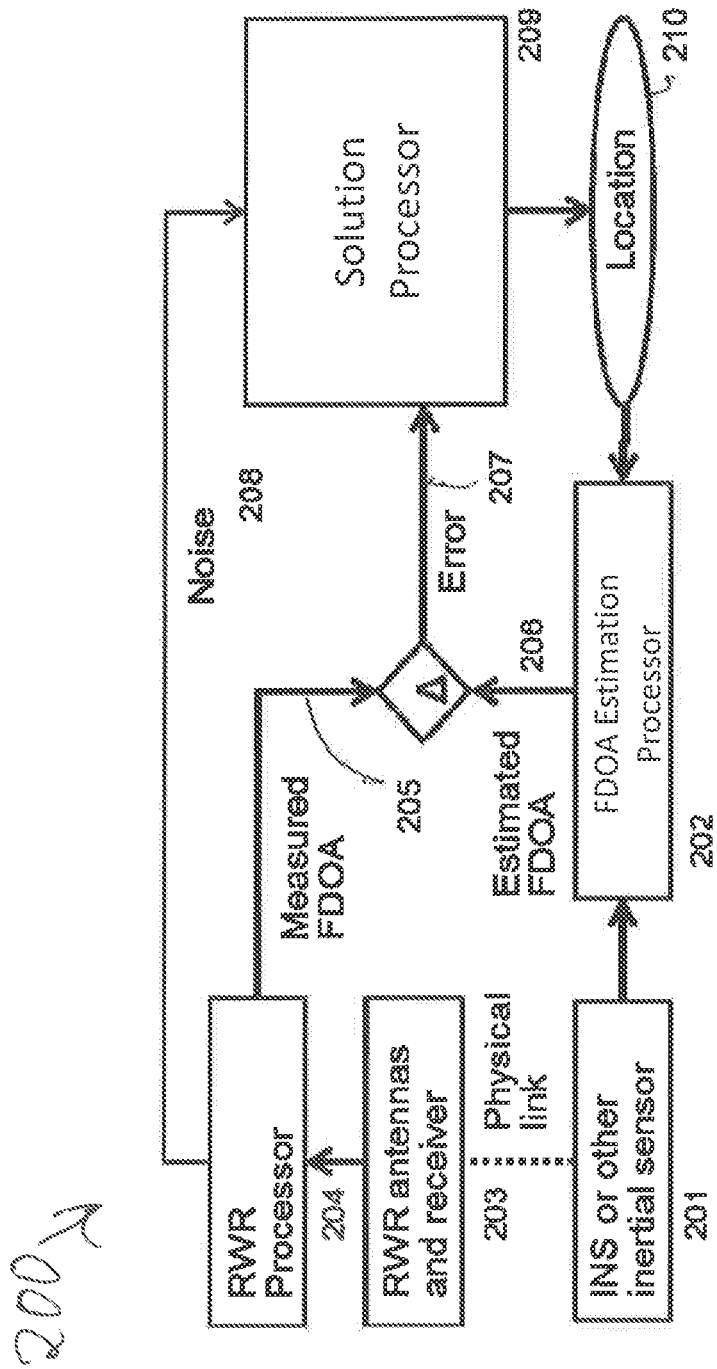
FIG. 2 is an overall block diagram of a system for determining the geolocation of a remote emitter, in accordance with an example embodiment of the present disclosure.

FIG. 2 depicts an overall block diagram of a processing system 200 that uses FDOA to determine geolocation, applies a classic Kalman Filter and gradient descent process to successive measurements as they occur. However, it should be noted that other techniques can be used, including but not limited to batch processing by least-mean-square, simplex, or conditional-probability density solution methods.

In particular, FIG. 2 is a simplified block diagram of a system 200 for estimating a location of a remote emitter using a passive radar warning receiver (RWR) to detect emitter radiation. RWR antennas and receiver 203 detect emissions from a remote emitter (e.g., remote emitter 140 of FIG. 1), and select emissions from at least two antennas of the RWR for geolocation processing.

The two antennas are mounted at known positions on the platform, hence the two antennas form a geometric baseline that moves in consort with the NAV sensor 201, by virtue of being on the same platform. Thus, NAV sensor 201 determines location, attitude, velocity, and attitude angle rates of the antenna baseline through known rigid-body calculations. This measurement of antenna motion by the NAV sensor 201 may be supplemented with measurements made by inertial measurement units at each antenna, in order to reduce errors due to airframe flexure. An FDOA estimation processor 202 converts the aforesaid parameters of location, attitude, and velocity into FDOA estimates 206 that are expected from this known antenna baseline geometry, position, and motion, together with a current estimated emitter location 210, using conventional geometric calculations.

Contemporaneously, the RWR processor 204 analyzes signal waveforms and yields FDOA measurements 205. The difference between measured FDOA 205 and estimated FDOA 206 is an error 207, which expresses an incorrectness of the current estimated location 210. Solution Processor 209 converts this error into a change in location 210, for each data sample. The Solution Processor 209 also creates an estimated emitter location 210, by making successive incremental improvements as each data sample arrives, or by batch processing in one calculation data samples that have accumulated over a period of time. Such solutions use standard techniques that best fit a solution to multiple measurements of noisy data, such as gradient descent or equation solution. Preferably but not necessarily, gradient descent methods are implemented in a Kalman Filter approach and its basic principle of weighting each value of error 207 by a measurement of noise 208; such that this weighting increases importance of measurements made when noise is low, and suppresses importance noise is high, thereby encouraging the smooth and accurate convergence of estimated location 210 to an accurate solution, with minimal extraneous divergence. Alternatively, the Solution Processor 209 can use a least-error simultaneous equation solution to calculate geolocation 210, such as set forth in U.S. patent application Ser. No. 14/283,826.

Figure 3:
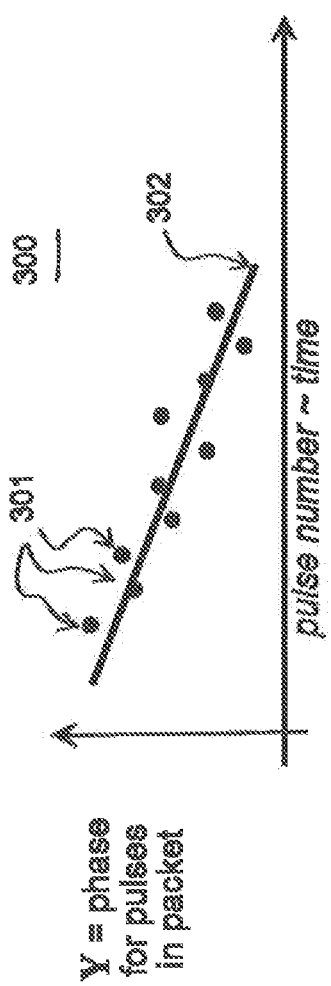
FIG. 3 illustrates an accurate FDOA measurement as determined by a single straight-line fit to FDOA measurements for each of several individual pulses, in accordance with an example embodiment of the present disclosure.

FIG. 3 is a graphical illustration 300 of successive measurements 301 of differential RF phase as done by RWR Processor 204 of FIG. 2. Differential phase is plotted on the y-axis, against time or sample number on the x-axis. For clarity of illustration, data are shown for only a few pulses, although in actuality there may be as many as hundreds or thousands of individual pulse measurements. This figure depicts a technique for precisely measuring FDOA, as described in U.S. patent application Ser. No. 13/946,217, which is incorporated herein by reference. This technique determines a phase of each pulse 301 received over time during an observation period, and then determines FDOA from a single straight-line fit 302 to differential phase versus time. The slope of this line is FDOA, with the tacit assumption that FDOA is constant over the observation period. Individual pulse measurements 301 vary randomly about this line of constant slope 302 due to noise in measurements of differential phase at each individual pulse. However, these random variations are well suppressed by the line fit. The slope values 302 for successive observations of the emitter signal are then passed as FDOA values to Solution Processor 209 of FIG. 2.

Figure 4:
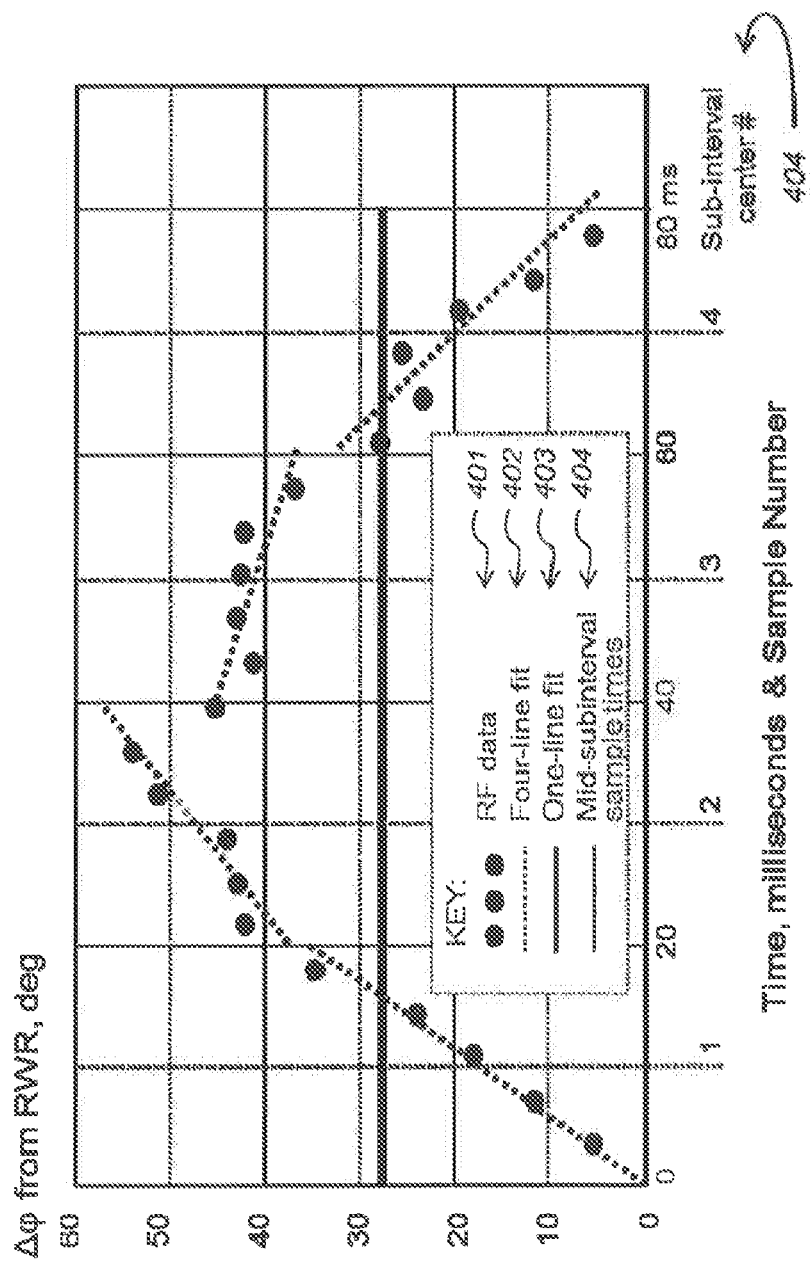
FIG. 4 illustrates a multi-linear fit to typical non-linear FDOA variations occurring over a single observation period, in accordance with an example embodiment of the present disclosure.

FIG. 4, like FIG. 3, is a graphical illustration of successive measurements of differential RF phase as done by RWR Processor of 204 FIG. 2, except with phase varying non-linearly. Again, differential phase is plotted on the y-axis, against time or sample number on the x-axis, and data are shown for only a few pulses, for clarity of illustration. In this figure, the differential phase of points 401 varies not just with random noise, but with a 3 Hz frequency component, which is typical of some aircraft, vibrations. There is no steady FDOA slope, as would be the case for an aircraft in so-called straight-and-level flight. The 3 Hz vibration is a dominant antenna motion component. As in FIG. 3, the varying phase measurements 401 are fit with a single straight line 403. However, it is clear that the 3 Hz variation in phase introduces variations in differential phase 401 that are not well fit with a single line. Using a standard numerical analysis technique of dealing with such data variations, the interval is subdivided into four shorter line segments 402, over four 20-millisecond sub-intervals 404 of the overall 80-millisecond observation. The slopes of these lines at center-points 404 of these intervals yields four FDOA values over each sub-interval. It is clear that the multiple FDOA values 402 are a much more accurate representation of these FDOA variations than the horizontal line of the single value 403.

However, as a practical matter, this subdivision of the larger interval has the disadvantage that fitting over a shorter time span reduces the integration time, which increases errors due to noise. For example, the fourfold reduction of sample time from 80 milliseconds to 20 milliseconds will increase random noise by a factor of two, using a common engineering rule of thumb. (This simple square root relationship adequately illustrates the point at hand, although an expert will recognize that the variation in slope of the line fit involves a somewhat more complex relationship, but the key point illustrated here remains valid nonetheless.)

Figure 5:
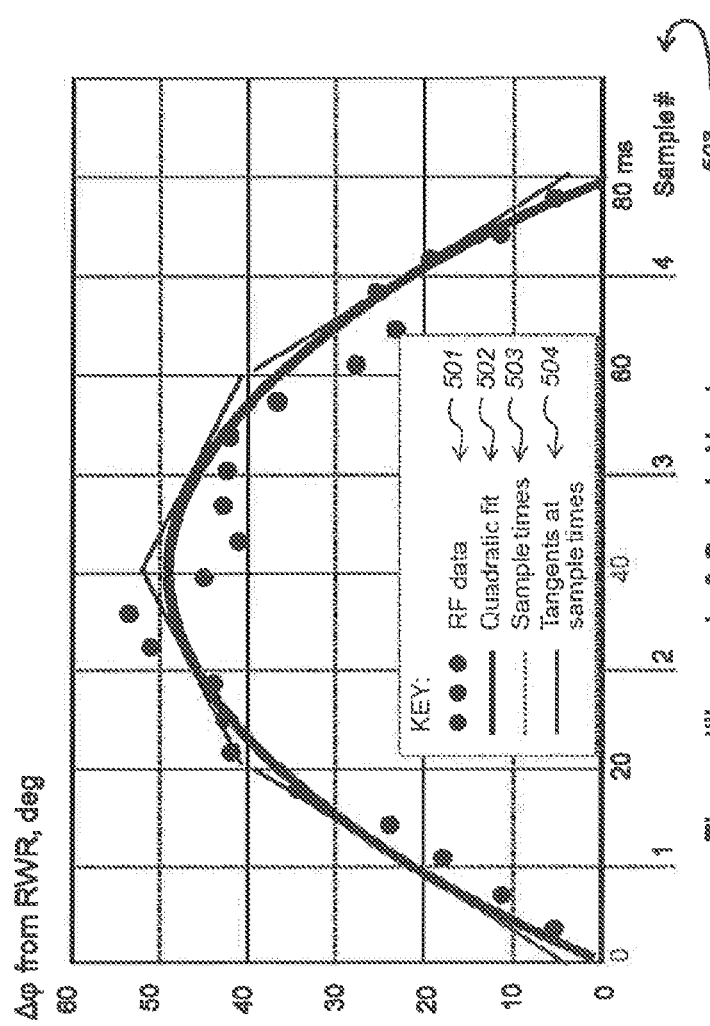
FIG. 5 illustrates both a multi-linear fit and a polynomial fit to typical non-linear FDOA variations occurring over a single observation period, in accordance with an example embodiment of the present disclosure.

FIG. 5, like FIG. 4, is a graphical illustration of successive measurements of differential RF phase as done by RWR Processor 204 of FIG. 2, with phase varying non-linearly. Again, differential phase is plotted on the y-axis, against time or sample number on the x-axis. RF data 501 are exactly the same as RF data 401 of FIG. 4, and vary with random noise plus a 3 Hz vibration component. The dominant antenna motion component is the 3 Hz vibration, individual measured values of differential phase 501 are least-mean-square fit over the entire 80-millisecond sample time by a quadratic polynomial 502, which is plotted as a broad line. The resultant polynomial equation is differentiated analytically to yield an equation for slope, and this slope equation is evaluated at sample times 503 at four sub-interval mid-points, shown as tangent lines 504. The slopes of each of these tangent lines 504 represents the FDOA values over each of the four subintervals. Note that the subintervals are the same as for FIG. 4, and that FDOA slope is evaluated at the same subinterval mid-points. The important and novel difference is that tangent lines 504 are derived from an equation fit over the entire 80 millisecond interval, whereas the fit lines 404 of FIG. 4 are fit only to subintervals of 20 millisecond duration.

Note that the quadratic polynomial fit to the data is in fact an assumption that the true motion over the interval does not vary in acceleration, which is much more realistic than the FIG. 4 assumption that velocity does not vary. This meets the first-principle fact that using an equation form appropriate to the physical phenomenology of the application will better minimize the effects of random noise, and better represent the true motion of the antennas. Experience with this technique shows that FDOA values determined from an appropriate equation fit yields a significant increase in geolocation accuracy. Visually, the slope lines in FIG. 5 shows more regularity than those in FIG. 4, illustrating this principle.

Figure 6:
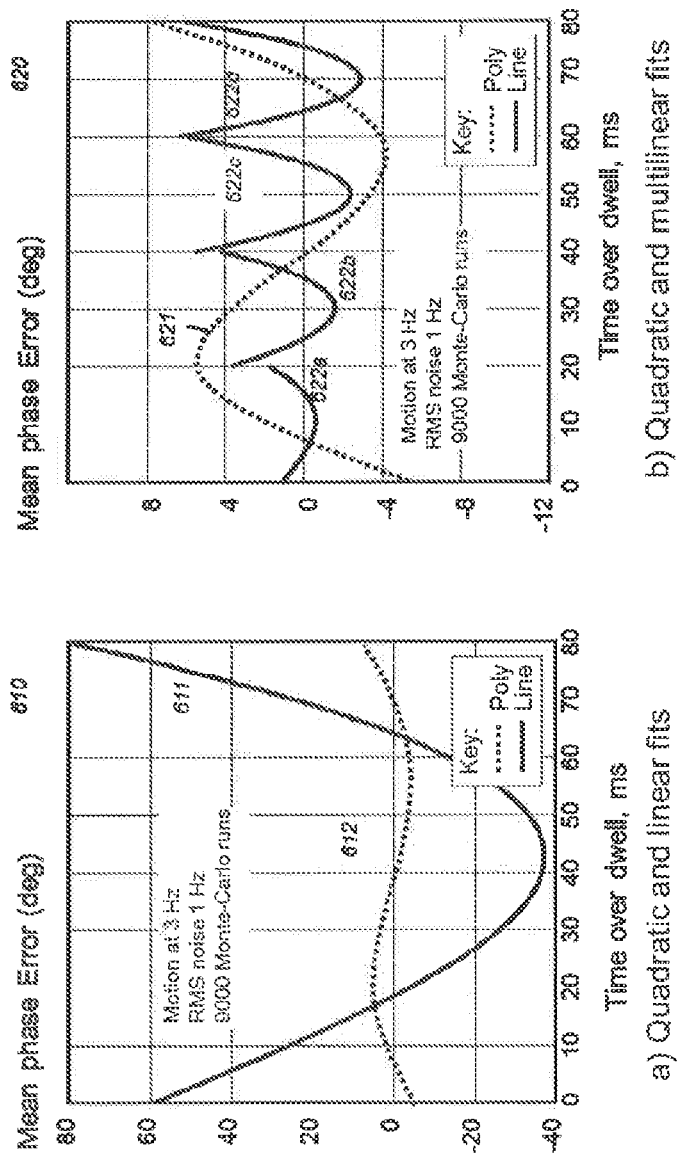
FIG. 6 illustrates the error produced by polynomial fit to that of a multi-linear fit of multiple line segments, in accordance with an example embodiment of the present disclosure.

FIG. 6 shows the average absolute value of differential RF phase error for both the straight-line fit 403 and quadratic fit 502, in a Monte Carlo Analysis. Differential phase error is plotted on the y-axis, against time or sample number on the x-axis. The RF data 501 are the same differential phase measurements 401 of FIG. 4, and vary with random noise plus a 3 Hz vibration component. Plot 610 shows mean phase error over an 80 second dwell time, for 9000 Monte-Carlo runs, each run having random noise and the same 3 Hz frequency, but with random phase of the 3 Hz signal relative to the dwell start time. In each run, both a least-mean-square quadratic and straight line fits were made to the data, and the fit error was calculated at each sample time. Curves 611 plots the mean error resulting from linear fits, and curve 612 shows the mean error from quadratic fits, in both cases, the RMS error was calculated at each sample time for the set of 9000 errors at that sample time. Note that negative and positive values cancel in this mean error plot, whereas RMS phase error would be uniformly large.

Plot 620 is similar, except curve 622 shows the mean error resulting from a multi-linear fit of four straight lines, each over a 20 millisecond span. Curve 621 shows the mean error of the same single quadratic fit over the entire 80 millisecond span as in curve 612. This plot shows errors in quadratic fit over the longer dwell of 80 milliseconds are comparable to the errors achieved with multi-linear fits over four 20 millisecond dwells for this particular sequence of phase data.

Quadratic fit 612 has an additional strong advantage that after one equation fit is performed over the entire dwell interval, the subinterval values can be calculated from fit coefficients, rather than recalculated from the sensor data. This is particularly significant when the dwell has a large number of sensor measurements, which is typical of a long sample of typical emitter pulse trains. For example, fitting the quadratic polynomial $P(t)=a+bt+ct^2$ to the differential phase measurements yields the linear equation $dP(t)/dt=b+2ct$ for phase rate of change, where $P(t)$ represents phase, the constant coefficient "b" represents average differential phase rate of change, and the linear coefficient "2c" represents changes from that average, and "t" represents time relative to the interval midpoint. When phase rate changes little over the dwell, the linear coefficient "2c" is negligible, and the single mid-interval value "b" is an adequate input to RWR Processor 204 and Solution Processor 209 of FIG. 2. When phase rate changes significantly, the linear coefficient is larger, but more extensive FDOA evaluation and solution processing still can be done simply by evaluating the simple linear equation at times corresponding to two or more subintervals within the overall dwell interval, without any further analysis of RF data samples. Moreover, the number of subintervals can be determined from just the one fit over the entire dwell, by adjusting subinterval duration such that the equation change over a subinterval width comparable to the equation fit error over the entire dwell, or other such criteria as will minimize overall error due to both noise and phase change.

By contrast, prior-art multi-linear fits require more processing and longer storage of the typically voluminous phase and or position data. This process desirably begins by fitting a single line over the entire the dwell interval, because a larger number of RF samples advantageously decreases noise. However, if this single linear fit proves inadequate, additional fits must be made to the entire set of sensor data, taken in turn over two or more subintervals. Adequacy of fit can be measured by the variance of source data about the fit line or lines, at least in the typical case where such variance is due primarily due to changes with time. However, more than one fit is required to determine adequacy if phase changes are dominated by random noise, before it can be determined that such time subdivision does not improve results.

The novel method of fitting a non-linear equation over the entire interval reduces the impact of noise, and quantifies phase change over time even when noise is high. Furthermore, it automatically reduces to a linear equation when phase change over time is small, as noted earlier.

Note that the above quadratic fit is but one example. It should be evident that further error reductions could be achieved by fitting other polynomial degrees, or an equation form that is more representative of the application. Equation forms may be deduced or derived from analyses of FDOA or TDOA data, from analysis of platform structural dynamics, or by other estimation methods. For example, fitting amplitude and phase of a 3 Hz sinusoid was a good match the known airframe resonance of one RWR application, although an equally good fit was achieved with a quadratic equation. A quadratic fit has been adequate over an extended sub-second time of typical of an RWR. The accuracy of fit may be increased with higher order cubic or quadratic or other equations, but determining more coefficients will decrease noise reduction inasmuch as the number of fit parameters is increased.

In the example of FIG. 6, quadratic fit 621 made to all the data samples, whereas each linear segment 622a-622b-622c-622d necessarily is made to one-quarter of the total number of data samples. The important result is the reduction in measurement error in fitting all data of an entire longer dwell, thereby capturing the well-known advantage of increasing the number of samples in suppressing noise in individual measurements.

Figure 7:
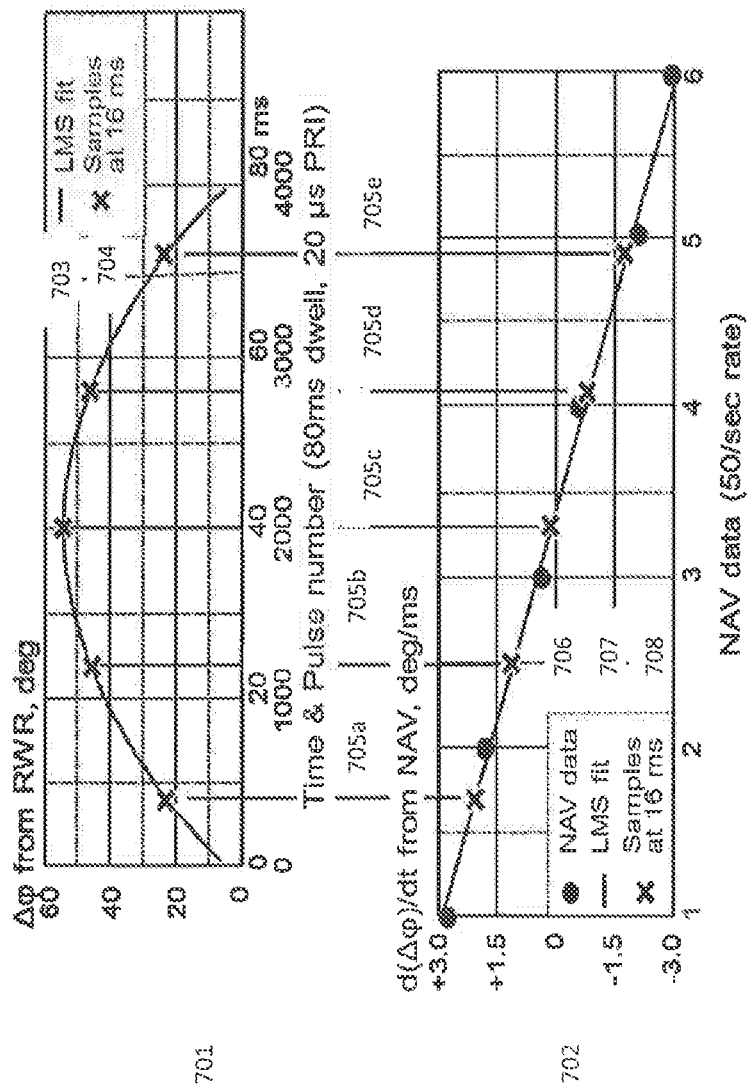
FIG. 7 illustrates a novel coordinated fit that synchronizes NAV & RWR measurements at each of several times within a single observation, in accordance with an example embodiment of the present disclosure.

FIG. 7 illustrates the use of coordinated equation fits to the RWR and NAV data, in accordance with an example embodiment of the present disclosure.

Chart 701 shows equation fit 703 made to differential RF phase data by RWR Processor 204 of FIG. 2, which is the same as Quadratic Fit 502 in FIG. 5. The y-axis is differential phase, and the x-axis is time or data sample number. This fit can be expressed as an algebraic function of time f(t) the form of this equation may be defined to model an anticipated data characteristic. In this figure, fix example, it is a quadratic equation f(t). The equation fit 703 is the same as quadratic fit 502 of FIG. 5, and is based on the same RF Data 501 of FIG. 5 and 401 of FIG. 4. As in FIGS. 4 and 5, the receiver dwell or observation period is 80 milliseconds. Points 704 are evaluations of the slope of fit 703, as made at several specific times, in this case at the same sample times shown in FIG. 5, which is at the center-points of 20-millisecond subintervals. Like equation fit 703, slope calculations 704 are made in RWR Processor 204 of FIG. 2, for ultimate use by Solution Processor 209 of FIG. 2.

Chart 702 shows NAV data over the same time interval of Chart 701. The y-axis shows differential phase rate of change, and the x-axis shows time. Relative to FIG. 2, differential phase rate of change rate 706 is calculated by FDOA Estimation Processor 202, from motion and aspect data of INS Sensor 201, as described earlier. Individual NAV data points 706 are plotted at times when data is provided by INS Sensor 201. Line 707 is a LMS line it to points 706, which assumes a constant acceleration (second derivative) in FDOA over the fit interval. The fit interval is chosen to cover the RWR sample interval, though NAV data 506 generally is provided at different times than the RF data of Chart 701. The NAV data is supplied on a scheduled basis from aircraft avionics, while the RF data occurs at times when the emitter transmits its RF signals. Points 708 are determined by evaluating the fit equation 707 at the sample times selected for RF data samples 704. The desirable form of equation 707 is the theoretical derivative f'(a) of the equation f(t) fit to the phase or time data the coefficients of equation f'(t) are adjusted to best fit the phase rate derived from the NAV data. However, once defined, this theoretical derivative function may be re-identified without the derivative notation as g(t), to simplify its definition to programmers who may not be comfortable with calculus notation. In this example, f(t) is a quadratic equation, and g(t) is a simple linear equation.

This coordinated curve-fit of NAV and RF data assures accurate time synchronization, and data smoothing that is based on identical motion assumptions. In this example, the RWR data is fit with a parabola, while the NAV data is fit with a straight line, which is to say that both equation forms assume constant acceleration. In contrast, a constant velocity assumption would fit RWR data with a straight line, and NAV data with a simple average. Also in this example, several samples of NAV data are available within the period of RWR observation. However, this same data coordination principle applies in cases where the NAV data are sparse (e.g., provided at intervals of only 100 or 200 milliseconds), though curve fits may include some NAV data outside the RWR observation period.

If the time interval over which NAV data is observed is much longer than that over which the emitter signal is observed, it may be desirable to fit the NAV data with a more complex equation than this coordinated curve fit, to take into account motion changes over the longer time interval. For example, the NAV and RWR data could both be fit with a quadratic equation; this will reduce data smoothing but also lessen noise reduction, because the increase in complexity requires additional coefficients to be evaluated. For NAV data from a central INS, the heavy filtering of a coordinated fit will reduce noise-like fluctuations due to flexure of the platform structure connecting antennas mechanically with the INS, and select the major maneuver motions that will be the same at both the INS and the antennas, which is a key, advantage of this invention. However, when individual inertial measurement units (IMUs) are located at each antenna, the data rate generally can be faster and the NAV observation period can more closely match that of the RWR data, and the coordinated fit remains appropriate. However, specifics of an application will determine the advantage of coordinated fit, which is one of many fit options that can be used with this invention.

Note that the curves are fit to the both RWR and NAV data before any evaluation of TDOA or FDOA, enabling the evaluation interval to be set optimally for each dwell. More frequent samples 704 and 708 are required to represent data if motions have vigorous accelerations, yet even single samples per dwell suffice when accelerations are minimal. This adaptive nature is important because it minimizes computational workload in systems where that is important, such as older RWR equipment or even newer equipment that is otherwise burdened with extensive computations.

Note also that deriving the data samples from an equation with relatively few coefficients enables the extensive source data to be discarded once these coefficients are determined. This significantly reduces the amount of data in temporary memory, since source data involves individual waveform samples at the waveform carrier frequency, which becomes large for long observations of high-frequency waveforms, particularly at radar frequencies. This data storage reduction is important because it minimizes memory requirements, which is important in any equipment when working memory space is a concern, such as older RWR equipment.

A number of determination algorithms can assure that RMS errors in fits are comparable to errors due to the velocity changes between sample points. For example, specific sample intervals can be set in inverse proportion to acceleration, which is measured by the curvature or quadratic term of the equation for RWR data 703 and/or by the linear term of the equation for NAV data 707. The result is a synchronized set of data samples for use in geolocation solutions that are based on the assumption of constant velocity, which are valid only if velocity changes over the sample interval is unimportant as compared with other error sources such as measurement noise. Deriving FDOA and/or TDOA measurements by equation fitting and evaluation is important because it minimizes noise by use of a long observation time, yet provides measurements at sample times short enough for the values to remain constant between samples, which is important because geolocation solutions are undesirably complex and burdensome if FDOA and/or TDOA must be modeled with changes over the sample period.

Figure 8:
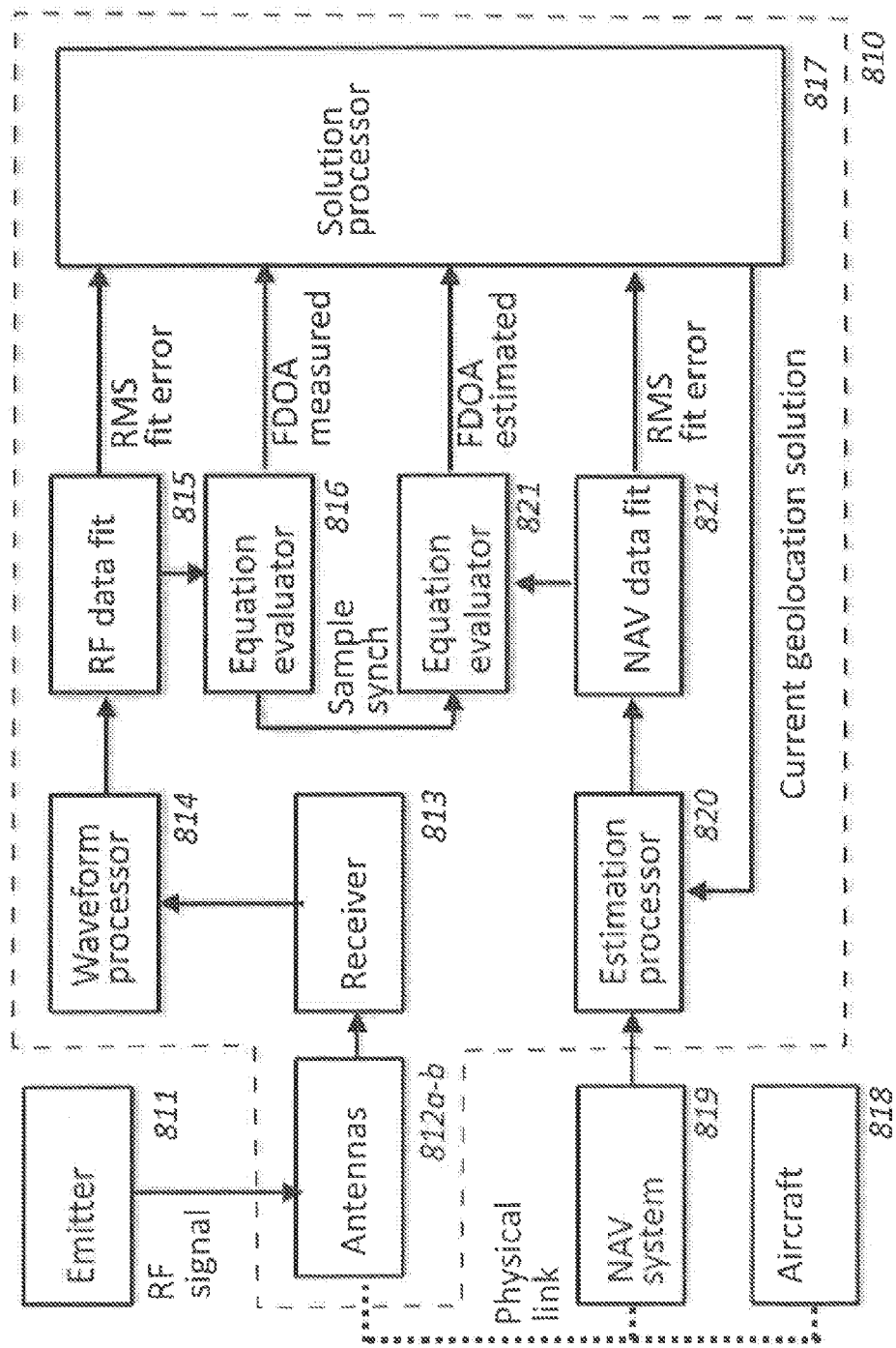
FIG. 8 is a functional block diagram of a location detection system, in accordance with an example embodiment of the present disclosure.

FIG. 8 depicts a block diagram of an airborne radar warning receiver 810 for geolocating a radar emitter 811 (e.g., emitter 140 of FIG. 1) by passive detection of its radiation, which typically are pulsed RF transmissions. This example shows an aircraft application, although the technique can be applied to many moving platforms, as noted earlier. Aircraft 818 carries both NAV system 819 and RWR 810, while Emitter 811 is separately mounted on the ground or on a slowly moving platform, such as a ship.

Emitter radiation is captured by RWR antennas 812a-b, along with other radiation. Receiver 813 selects signals from a selected receiver, by means of waveform characteristics such as frequency, pulse repetition interval, and the like. Receiver 813 also selects an appropriate antenna pair by such criteria as signal strength and antenna adjacency. Waveform processor 814 then makes precision measurements of FDOA and TDOA by such processes as leading edge detection, combined with cross-correlation analysis, or other techniques. The remainder of this discussion focuses on FDOA, although it will be obvious that the same techniques of sampling and synchronization can be applied to TDOA measurements.

Individual differential phase measurements are made for each RF signal pulse over the time the emitter waveform is available and selected by Receiver 813. Since a typical emitter waveform is a series or packet of RF pulses, there generally are many pulses over the time of each receiver observation or dwell. RF Data Fit 815 then determines coefficients of a best-fit equation for these differential phase data points, using an equation form suited to the anticipated data characteristics. For example, a quadratic polynomial fit can be used, with the assumption that antenna motions have a constant acceleration over the period of observation. RF Data Fit 815 also determines the error in data fit, which is an evaluation of data noise.

At selected times within the observation, the coefficients calculated by RF data fit 815 are applied to the derivative of the fit equation, creating an equation for the slope of the fit equation. For example, a quadratic equation of $a+bt+ct^2$ yields a slope equation of $b+2ct$, where t is the time within the observation interval. Equation evaluator 816 then calculates FDOA from this slope equation, at specific sample times within the interval. Sample times may be but need not be uniformly spaced, and also may be made variable, occurring at shorter intervals when coefficient "c" of the slope equation is large, signifying rapidly changing FDOA, and occurring at longer intervals when coefficient "c" is small, signifying relatively unchanging FDOA. Criteria for setting this interval also may consider noise in the data, as measured by the RMS fit error determined by RF data fit 815.

The NAV System 819 measures aircraft position, orientation, and motion. It is part of aircraft avionics, and provides such data to the RWR 810 over an aircraft or avionics data bus. These data samples are provided at set time intervals that have no synchrony with emitter transmissions, although the time of samples is provided to the RWR. The RWR Estimation Processor 820 analyzes NAV data with reference to the internal RWR clock, or in absolute GPS time, or some other uniform time scale. Thus the data times are known, even though these NAV data samples do not occur simultaneously with RF data samples.

Supplemental inertial motion units (IMUs) or other such sensors may be included within Antennas 812a-b, but are not essential to embodiments of the present disclosure. IMUs can give a more precise measurement of true antenna motion than possible with NAV System 819 alone, since they are located at the antennas themselves. As discussed earlier, this is particularly helpful applications for larger aircraft, where flexure of the large airframe prevents turbulent motions and vibrations of antennas mounted at wingtips or other peripheral aircraft surfaces from being measured accurately by a NAV System within the internal aircraft frame. Requirements for supplemental IMUs are reduced by the fact that NAV System 819 provides long-term accuracy inherent in the larger and more expensive equipment used for navigation.

Estimation Processor 820 uses these NAV data in conjunction with the current geolocation solution, and develops an estimated FDOA value for each sample provided by NAV System 819. NAV Data Fit 821 then determines coefficients of a best-fit equation for these data points, using an equation form suited to the anticipated data characteristics. For example, a linear polynomial fit can be used, with the assumption that antenna motions have a constant acceleration over the period of observation. NAV Data Fit 821 also determines the error in data fit, which is an evaluation of data noise.

At each synchronized calculation time, Solution Processor 817 accepts measured and estimated FDOA values from RF Data Fit 815 and NAV Data Fit 821, respectively, and uses these inputs to update its solution for emitter geolocation. As shown in this example, Solution Processor 817 also accepts two measures of noise in these source data, the RMS fit error from RF Data Fit 815 and NAV Data Fit 821, and combines these two noise metrics into a single RMS value for use in weighting the error between measured and estimated FDOA. This noise weighting is not necessary to embodiments of the present disclosure, but is highly desirable, inasmuch as it gives emphasis to data with lower noise, thus reducing divergence and noise in the solution.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be an FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include (and can be operatively coupled to receive data from and/or transfer data to) one or more mass storage devices for storing data (e.g., magnetic, magneto-optical disks, or optical disks).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The teachings of all patents, published applications and references cited herein are incorporated by reference in their entirety.

While the present disclosure has been particularly shown and described with references to example embodiments thereof, it will be understood by those skilled in the art that various changes in form and details may be made therein without departing from the scope of the present disclosure encompassed by the appended claims.

What is claimed is:

1. A method of geolocating a remote emitter, the method comprising:
   detecting, at two antennas positioned at respective locations on a platform, signals from the remote emitter along with their respective times of arrival over a series of observation periods;
   calculating, by a radar warning receiver (RWR) coupled to the two antennas, an estimate of the remote emitter geolocation based on signal amplitude measurements of the detected signals;
   selecting, by the RWR, a time equation f(t) representing TDOA variation of the detected signals corresponding to a differential motion of the two antennas over each of the observation periods, the differential motion comprising: a substantially constant acceleration of the antennas, a substantially constant velocity of the antennas, a sinusoidal motion of the antennas of a certain frequency, or flexure or vibration characteristics of the platform identified in TDOA data corresponding to the signals;
   determining, by the RWR, equation coefficients for the selected time equation f(t) such that the time equation f(t) best fits the measured differential time of arrival of the detected remote emitter signal;
   determining, by the RWR, equation coefficients for a time-derivative equation f'(t) of the time equation f(t) with the determined coefficients;
   determining, by the RWR, calculation sampling times over an interval at which data samples will be generated;
   determining, by the RWR, measured remote emitter signal frequency difference of arrival (FDOA) values from the time-derivative equation f'(t), and/or measured remote emitter signal time difference of arrival (TDOA) values from the time equation f(t), at the calculation sampling times;
   measuring, by inertial and location sensors provided on the platform, platform position and motion data, comprising motion, attitude, and position data of the two antennas at corresponding motion sampling times over a time frame generally preceding and including each observation period of the series of observation periods;
   determining, by the RWR, FDOA and/or TDOA values at the motion sampling times, based upon the estimated remote emitter geolocation and the measured platform position and motion data;
   calculating, by the RWR, by time interpolation of the determined FDOA and/or TDOA values at the motion sampling times, predicted FDOA and/or TDOA values at the calculation sampling times for each observation period;
   comparing, by the RWR, the measured and predicted FDOA and/or TDOA values corresponding to the calculation sampling times, using one of: a Kalman process, or a least mean square process and generating an error value; and
   modifying, by the RWR, the estimated remote emitter geolocation as a function of the generated error value.

2. The method of claim 1, wherein motion sampling times are times used for measuring FDOA and/or TDOA values from the step of detecting.

3. The method of claim 1, further comprising:
   for each of the measured and predicted FDOA and/or TDOA values, the RWR calculating estimated noise as an RMS sum over the subject observation period between sampled data and a curve fit of the sampled data; and
   using the RMS sum for noise-weighting of the generated error value, thereby reducing solution errors due to measurement noise.

4. The method of claim 1, wherein the time function f(t) is a polynomial function.

5. The method of claim 1, wherein the platform is one of: an aircraft, a ship, a missile, and a spacecraft.

6. The method of claim 1, wherein the two antennas are adapted to detect electromagnetic radiation and the remote emitter is a radar source.

7. The method of claim 1, wherein comparing the measured and predicted FDOA and/or TDOA values further comprises comparing current and previous measured and predicted FDOA and/or TDOA values over each of one or more observation intervals.

* * * * *